United States Patent
Cho et al.

(10) Patent No.: US 9,862,839 B2
(45) Date of Patent: Jan. 9, 2018

(54) PIGMENT HAVING EXCELLENT ELECTRICAL CONDUCTIVITY AND CORROSION RESISTANCE AND METHOD FOR PREPARING SAME

(71) Applicant: CQV CO., LTD., Chungcheongbuk-do (KR)

(72) Inventors: Eun-Suk Cho, Cheongju-si (KR); Kil-Wan Chang, Cheongju-si (KR); Kwang-Soo Lim, Chungcheongbuk-do (KR); Byung-Ki Choi, Cheongju-si (KR); Bong-Geun Song, Seoul (KR); Kwang-Choong Kang, Cheongju-si (KR)

(73) Assignee: CQV CO., LTD., Jincheon-gun, Chungcheongbuk-do (KR)

( * ) Notice: Subject to any disclaimer, the term of this patent is extended or adjusted under 35 U.S.C. 154(b) by 0 days.

(21) Appl. No.: 15/028,702

(22) PCT Filed: Oct. 28, 2014

(86) PCT No.: PCT/KR2014/010210
§ 371 (c)(1),
(2) Date: Apr. 11, 2016

(87) PCT Pub. No.: WO2015/065025
PCT Pub. Date: May 7, 2015

(65) Prior Publication Data
US 2016/0257822 A1    Sep. 8, 2016

(30) Foreign Application Priority Data
Oct. 28, 2013 (KR) .................. 10-2013-0128808

(51) Int. Cl.
*A61K 8/02* (2006.01)
*C09D 5/24* (2006.01)
(Continued)

(52) U.S. Cl.
CPC ............... *C09D 5/24* (2013.01); *C03C 17/10* (2013.01); *C09C 1/00* (2013.01); *C09C 3/06* (2013.01);
(Continued)

(58) Field of Classification Search
CPC ...................................................... A61K 8/19
(Continued)

(56) References Cited

U.S. PATENT DOCUMENTS 3,536,520 A    10/1970 Marshall et al.
2009/0017082 A1*    1/2009 Morimitsu ............... A61K 8/19
                                                                424/401

FOREIGN PATENT DOCUMENTS

CN    101384674 A    3/2009
JP    S63-43962 A    2/1988
(Continued)

OTHER PUBLICATIONS

International Search Report dated Dec. 19, 2014 corresponding to International Application No. PCT/KR2014/010210.
(Continued)

*Primary Examiner* — Khanh Tuan Nguyen
(74) *Attorney, Agent, or Firm* — Hauptman Ham, LLP

(57) ABSTRACT

Disclosed are a pigment having excellent electrical conductivity and corrosion resistance and a method for preparing the same. The method for preparing a pigment according to the present invention comprises the steps of: (a) stirring and dispersing flakes in water to form a suspension; (b) forming a catalyst layer on surfaces of the flakes; and (c) plating the surfaces of the flakes on which the catalyst layer is formed.

7 Claims, 7 Drawing Sheets

(51) Int. Cl.
  *C09C 3/06*    (2006.01)
  *C09C 1/00*    (2006.01)
  *C03C 17/10*   (2006.01)
  *C09D 17/00*   (2006.01)

(52) U.S. Cl.
  CPC ........ *C09D 17/006* (2013.01); *C01P 2004/03* (2013.01); *C01P 2004/20* (2013.01); *C01P 2004/64* (2013.01); *C01P 2006/40* (2013.01); *C03C 2217/261* (2013.01)

(58) Field of Classification Search
  USPC ........................................................ 424/401
  See application file for complete search history.

(56) References Cited

FOREIGN PATENT DOCUMENTS

| | | | |
|---|---|---|---|
| JP | S 6343962 A | * | 2/1988 |
| JP | H2-24358 A | | 1/1990 |
| JP | H9-157557 A | | 6/1997 |
| JP | 2002-30232 A | | 1/2002 |
| JP | 2002-363771 A | | 12/2002 |
| KR | 20060105922 A | | 10/2006 |
| KR | 20080109758 A | | 12/2008 |
| KR | 20110078265 A | | 7/2011 |
| KR | 20120122025 A | | 11/2012 |
| WO | 03053683 A1 | | 7/2003 |

OTHER PUBLICATIONS

G. Jiang et al., "Preparation of nickel coated mica as a conductive filler", Elsevier Science, Nov. 2001, p. 745-751, Composites Part A 33 (2002), total 7 pages.

M. Gilbert et al., "Nickel coated mica for conductive compounds", Macromolecular Symposia, Apr. 2003, p. 219-224, 194-1, total 6 pages.

Extended European Search Report dated Aug. 31, 2016 corresponding to Application No. 14856867.8-1375.

Japanese Office Action dated Jun. 6, 2017 for Japanese Patent Application No. 2016-525587.

Chinese Office Action dated Jul. 14, 2017 for Chinese Patent Application No. 201480058942.3.

* cited by examiner

US 9,862,839 B2

PIGMENT HAVING EXCELLENT ELECTRICAL CONDUCTIVITY AND CORROSION RESISTANCE AND METHOD FOR PREPARING SAME

TECHNICAL FIELD

The present invention relates to a technology for preparing a pearl pigment, and more specifically, to a functional pigment having excellent electrical conductivity and corrosion resistance and a method for preparing the same.

BACKGROUND ART

Pearl pigments are used in various fields. For example, for industrial applications, the pearl pigments are used for wallpaper, floor, plastic molding, leather coating, silk printing, offset printing, painting of home appliances, ceramics applications, etc. In addition, for cosmetic applications, the pearl pigments are used for a wide range of color cosmetics such as lipsticks, nail polish, hair gel, eye shadow, lip gloss, etc. Further, the pearl pigments are used for interior and exterior painting for automobiles, construction, and ship paints which require high weather resistance.

In addition, functional pearl pigments have excellent properties such as heat resistance, chemical stability, electrical conductivity, electromagnetic shielding property, corrosion resistance, etc., which are possible to be widely available in many industrial fields.

In general, the pearl pigments are prepared by $SnCl_4$ coating on a plate-shaped substrate using hydrothermal synthesis, followed by $TiO_2$ coating thereon. However, the hydrothermal synthesis has limitations in that a time required for coating reaction is long, and it is not possible to coat a metal salt.

Korean Patent Laid-Open Publication No. 10-2006-0105922 (published on Oct. 12, 2006) disclosed a metal-based pearl pigment and a method for preparing the same, as a Patent Document relevant to the present invention.

DISCLOSURE

Technical Problem

It is an aspect of the present invention to provide a method for preparing a pigment having excellent electrical conductivity and corrosion resistance by plating.

It is another aspect of the present invention to provide a pigment having excellent electrical conductivity and corrosion resistance by forming a plating layer on a surface thereof.

Technical Solution

In accordance with one aspect of the present invention, a method for preparing a pigment includes:

(a) stirring and dispersing flakes in water to form a suspension;

(b) forming a catalyst layer on surfaces of the flakes; and (c) forming a metal layer by plating the surfaces of the flakes on which the catalyst layer is formed.

Here, the flake may be a plate-shaped flake having a size of 5 μm to 100 μm.

In addition, in step (a), the suspension may include 1 wt % to 20 wt % flakes.

Further, step (b) may include: (b1) adding and stirring a tin compound to the dilution to coat tin (Sn) on the surfaces of the flakes, (b2) dehydrating and washing resultant materials of step (b1), (b3) adding the dehydrated and washed flakes to a palladium compound solution to separate tin from the surfaces of the flakes and to coat the palladium, and (b4) dehydrating and washing resultant materials of step (b3). Here, in step (b2) or step (b4), the dehydrating and washing may be performed two (2) to four (4) times.

In addition, the catalyst layer may contain palladium, the metal layer may contain nickel, and the plating may be an electroless plating method. In this case, step (c) may include: (c1) adding the flakes on which the catalyst layer containing the palladium is formed to an electroless nickel plating liquid containing sodium hypophosphite, (c2) electroless nickel plating on the catalyst layer at a temperature of 70° C. or more for 1 minute or more, and (c3) dehydrating and washing the flakes on which the nickel is plated, followed by drying. In addition, the electroless nickel plating in step (c2) may be performed at a temperature of 80° C. to 90° C. for 1 to 30 minutes.

In accordance with another aspect of the present invention, a pigment includes: flakes; a catalyst layer formed on the flakes; and a metal layer formed on the catalyst layer.

Here, the catalyst layer may contain palladium, and the metal layer may contain nickel.

Advantageous Effects

According to the method for preparing the pigment of the present invention, a metal layer having excellent corrosion resistance and electrical conductivity, for example, nickel, may be formed on surfaces of flakes by plating, in particular, by electroless plating, and thus, it is possible to provide electrical conductivity and corrosion resistance which are difficult to be implemented in the existing pigments.

In addition, since the method for preparing the pigment of the present invention is performed by the plating, it is possible to perform a continuous process and stable treatment.

BEST MODE

Hereinafter, a pigment having excellent electrical conductivity and corrosion resistance and a method for preparing the same according to the present invention are described in detail with reference to the accompanying drawings.

Figure 1:
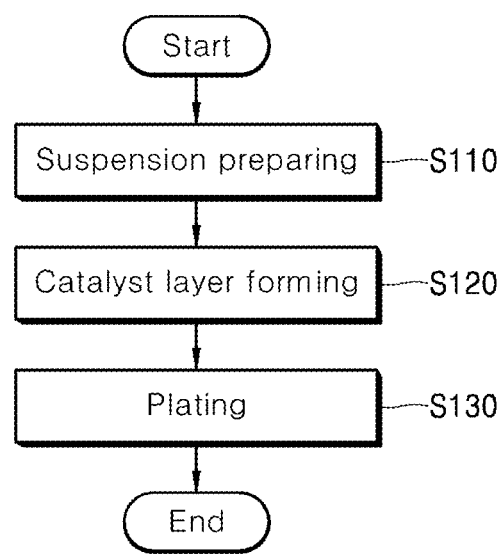
FIG. 1 is a flowchart schematically showing a method for preparing a pigment according to the present invention.

FIG. 1 is a flowchart schematically showing the method for preparing the pigment according to the present invention.

Referring to FIG. 1, the method for preparing the pigment according to the present invention includes a step of preparing a suspension (S110), a step of forming a catalyst layer (S120), and a step of plating (S130).

First, in the step of preparing the suspension (S110), flakes are stirred and dispersed in water such as deionized water or distilled water to form the suspension. As the flake material, a glass, natural mica, synthetic mica, plate-shaped iron oxide, alumina flake, a metal flake, and a metal oxide-coated composition, etc., may be used. The flake is more preferably a plate-shaped flake having a size of 5 μm to 100 μm. When the flake has a size of less than 5 μm, a surface of the flake is coated with a material and the flake may be changed into a spherical form. On the contrary, when the flake has a size of more than 100 μm, since a coated surface area is increased, it may be difficult to express colors.

Meanwhile, it is more preferable that the suspension includes 1 wt % to 20 wt % flakes. When the flakes have an amount of less than 1 wt %, a plating reaction may not be generated, and when the flakes have an amount of more than 20 wt %, a reaction efficiency may be deteriorated.

After the suspension is prepared, a process of removing dust and dirt may be performed for 10 to 30 minutes by using about 1% to 10% hydrochloric acid dilution.

Then, in the step of forming the catalyst layer (S120), the catalyst layer is formed on surfaces of the flakes.

The catalyst layer may be referred to as an activating layer for forming a plating layer.

The catalyst layer may be formed by including precious metals such as palladium, platinum, etc.

Figure 2:
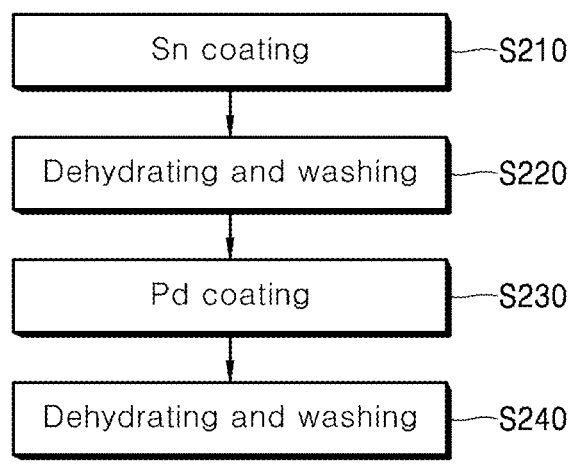
FIG. 2 shows an example in which palladium is attached onto surfaces of flakes.

FIG. 2 shows an example in which palladium is attached onto surfaces of flakes as the catalyst layer.

Referring to FIG. 2, the palladium catalyst layer may be formed as follows.

First, a tin compound such as $SnCl_2$ is added and stirred to the suspension, thereby coating tin (Sn) on the surfaces of the flakes (S210). The tin compound may be added in an amount of about 1 to 5 parts by weight based on 100 parts by weight of the suspension.

Then, the resultant materials coated with tin are dehydrated and washed (S220). Here, the dehydrating and washing process is preferably performed two (2) to four (4) times. When the dehydrating and washing process is performed once (1), a $SnCl_2$ solution may be reacted with a $PdCl_2$ solution, such that the $PdCl_2$ solution may be contaminated by black. On the contrary, when the dehydrating and washing process is excessively performed five (5) or more times, substrates may collide with each other, such that scratch phenomenon may severely occur. The number of dehydrating and washing processes may be applied as the same as subsequent dehydrating and washing process (S240 in FIGS. 2 and S330 in FIG. 3).

Next, the dehydrated and washed flakes are added to a palladium compound solution such as $PdCl_2$, to separate tin from the surfaces of the flakes and to coat the palladium (S230). In this process, tin ($Sn^{2+}$) attached onto the surfaces of the flakes is reacted with Pd to be $Sn^{4+}$, and detached from the surfaces of the flakes, and Pd is coated onto the region from which the tin is detached. The palladium compound in the palladium compound solution may have a concentration of about 0.1 g/L to 10 g/L. This process may be performed at room temperature for about 5 to 20 minutes.

Then, the resultant materials coated with palladium are dehydrated and washed (S240).

Next, in a plating step (S130), the surfaces of the flakes on which the catalyst layer is formed are plated. The metal to be coated on the surface of the catalyst layer may be nickel, copper, tin, gold, silver, etc.

The plating may be electroless plating, and the palladium is coated as the catalyst layer formed on the surfaces of the flakes. When nickel plating is performed, electroless plating may be performed in the same manner as the example of FIG. 3.

First, the flakes on which the catalyst layer containing the palladium is formed are added to an electroless nickel plating liquid containing sodium hypophosphite (S310).

Then, the electroless nickel plating is performed on the catalyst layer at a temperature of 70° C. or more for 1 minute or more (S320). Here, since the electroless nickel plating is not performed at a temperature of less than 70° C. or for less than 1 minute, the electroless nickel plating is preferably performed at a temperature of 70° C. or more for 1 minute or more, and more preferably, at a temperature of 80° C. to 90° C. for 1 to 30 minutes.

Then, the flakes on which the nickel is plated are dehydrated and washed, and then dried at a temperature of about 30° C. to 120° C., thereby completing the preparation of nickel-plated pearl pigment (S330).

According to the method of the present invention, a pigment including a catalyst layer formed on the surfaces of the flakes and the metal layer formed on the catalyst layer may be prepared.

Figure 3:
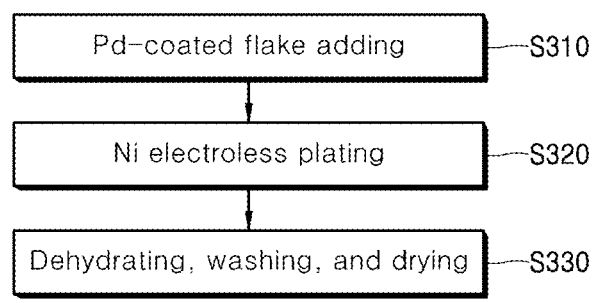
FIG. 3 shows an example of plating nickel on the surface of the flakes using electroplating.

As described in FIGS. 2 and 3, the catalyst layer may contain palladium, and the metal layer may contain nickel.

EXAMPLE

Hereinafter, a constitution and action of the present invention are described in more detail through the following preferable Examples of the present invention.

It is to be noted that Examples to be described below are provided merely for specifically exemplifying the present invention, and accordingly, the present invention is not limited to the following Examples.

Descriptions which are not described in the specification can be sufficiently and technically deduced by a person skilled in the technical field, and accordingly, details thereof will be omitted.

1. Preparation of Pearl Pigment Sample (1) Example 1

Glass flakes having an average size of 50 μm were added in deionized water (D.I. water) to prepare 10 wt % flake suspension. Then, the flake suspension was pre-treated with 5% with hydrochloric acid dilution for 20 minutes.

Next, based on 100 parts by weight of the suspension, 3 wt % $SnCl_2$ was added to the suspension to perform activation for 15 minutes, such that tin was attached onto surfaces of the flakes. Then, a dehydrating and washing process was performed twice.

Subsequently, the resultant materials were added to 5 g/L $PdCl_2$ solution to perform activation at room temperature for 10 minutes, such that tin was separated from the surfaces of the flakes and palladium was attached thereonto. Then, the dehydrating and washing process was performed twice.

Next, nickel plating was performed at 80° C. for 10 minutes using a nickel plating liquid of which a nickel (Ni) concentration was 2 g/L. In addition, the dehydrating and washing process was performed twice, and the resultant materials were completely dried at 100° C. in a drier, thereby obtaining an electroless nickel-plated pearl pigment.

(2) Example 2

Example 2 was performed by the same method as Example 1 above, except that the treated flakes were added to the nickel electroless plating liquid, and nickel plating was performed at 80° C. for 10 minutes using a nickel plating liquid of which a nickel (Ni) concentration was 5 g/L. Then, the resultant materials were completely dried at 100° C. in a drier, thereby obtaining an electroless nickel-plated pearl pigment. At the time of increasing the Ni concentration to 5 g/L, the reducing agent and the complexing agent were also increased together.

(3) Example 3

Example 3 was performed by the same method as Example 1 above, except that the treated flakes were added to the nickel electroless plating liquid, and nickel plating was performed at 80° C. for 10 minutes using the nickel plating liquid of which a nickel (Ni) concentration was 10 g/L. Then, the resultant materials were completely dried at 100° C. in a drier, thereby obtaining an electroless nickel-plated pearl pigment. At the time of increasing the Ni concentration to 10 g/L, the reducing agent and the complexing agent were also increased together.

(4) Example 4

Example 4 was performed by the same method as Example 1 above, except that the treated flakes were added to the nickel electroless plating liquid, and nickel plating was performed at 80° C. for 10 minutes using the nickel plating liquid of which a nickel (Ni) concentration was 20 g/L. Then, the resultant materials were completely dried at 100° C. in a drier, thereby obtaining an electroless nickel-plated pearl pigment. At the time of increasing the Ni concentration to 20 g/L, the reducing agent and the complexing agent were also increased together.

(5) Comparative Example 1

Comparative Example 1 was performed by the same method as Example 1 above, except that $TiO_2$ coating was performed by hydrothermal synthesis without performing electroless nickel plating, wherein the suspension to be used was the same as that of Example 1.

(6) Comparative Example 2

Nickel flakes were used as the substrate, and the electroless nickel plating was not performed, but the substrate itself was used for the experiment.

(7) Comparative Example 3

An acrylic resin was coated on an iron sample having a size of 5×10 cm without the pearl pigment.

2. Evaluation of Physical Properties (1) Measurement of color difference meter (measured by MINOLTA cm-512 $m^3$ at 75 degrees)

Measurement of Examples and Comparative Examples was performed on a black background after drawdown of the samples to PC 4% (with NC Resin) on an opacity chart.

The measurement results of color difference meter were shown in Table 1 below.

TABLE 1

| | L | a | b |
|---|---|---|---|
| Example 1 | 22.48 | 0.18 | 1.55 |
| Example 2 | 28.81 | −0.44 | 2.04 |
| Example 3 | 37.18 | −0.75 | 3.14 |
| Example 4 | 47.12 | 0.59 | 4.59 |
| Comparative Example 1 | 32.54 | −0.25 | −5.32 |
| Comparative Example 2 | 45.73 | 1.12 | 4.24 |

Referring to Table 1 above, it could be seen that Examples 1 to 4 had increased luminosity (L) as the nickel amount was increased in the electroless plating liquid. In addition, referring to Table 1 above, it could be seen that all of a and b values of Examples 1 to 4 were distributed in a region similar to colorlessness. Accordingly, it could be appreciated that the nickel coating layer according to the present invention had improved brightness and chroma.

(2) Evaluation of Electrical Conductivity

Electrical conductivity (specific resistance) of the pearl pigment samples prepared by Examples 1 to 4 and Comparative Examples 1 and 2 were shown in Table 2 below.

TABLE 2

| | Ni concentration (g/L) | Plating thickness (μm) | Ratio with substrate | Specific resistance (Ω · cm) |
|---|---|---|---|---|
| Example 1 | 2 | 0.05 | 0.1:2.8 | $3.24 \times 10^{-1}$ |
| Example 2 | 5 | 0.1 | 0.1:1.4 | $1.15 \times 10^{-1}$ |
| Example 3 | 10 | 0.15 | 0.3:2.8 | $2.34 \times 10^{-2}$ |
| Example 4 | 20 | 0.2 | 0.1:0.7 | $1.79 \times 10^{-3}$ |
| Comparative Example 1 | — | — | — | — |
| Comparative Example 2 | — | ∞ | — | $2.38 \times 10^{4}$ |

Referring to Table 2 above, it could be seen that the pearl pigment samples prepared by Examples 1 to 4 showed electrical conductivity, and the pearl pigment sample prepared by Comparative Example 1 showed an insulation property. In addition, it could be appreciated that as the nickel concentration was increased in the nickel plating liquid, the plating thickness became thick, such that specific resistance was reduced, and thus, electrical conductivity was more excellent.

(3) Evaluation of Corrosion Resistance

Corrosion resistance (red rust occurrence time) of the pearl pigment samples prepared by Examples 1 to 4 and Comparative Examples 1 and 3 were shown in Table 3 below.

For measure corrosion resistance, the red rust occurrence time was measured by a salt spray test.

The salt spray test was performed as follows:

A sample coated with 4% pigment+acrylic resin on an iron plate having a size of 5×10 cm Spray environmental temperature of 35° C., salt water concentration of 5% NaCl, specific gravity of 1.02 to 1.04, and pH of 6.5 to 7.2

The salt spray test was performed until 1000 hours.

TABLE 3

|  | Ni concentration (g/L) | Plating thickness (μm) | Ratio with substrate | Red rust occurrence time (hr) |
|---|---|---|---|---|
| Example 1 | 2 | 0.05 | 0.1:2.8 | 690 |
| Example 2 | 5 | 0.1 | 0.1:1.4 | 850 |
| Example 3 | 10 | 0.15 | 0.3:2.8 | 960 |
| Example 4 | 20 | 0.2 | 0.1:0.7 | 1000 or more |
| Comparative Example 1 | — | — | — | 280 |
| Comparative Example 2 | — | ∞ | — | 1000 or more |
| Comparative Example 3 | — | — | — | 180 |

Referring to Table 3 above, it could be appreciated that the pearl pigment samples prepared by Examples 1 to 4 had relatively excellent corrosion resistance as compared to Comparative Examples 1 and 3. In addition, it could be appreciated that as the nickel concentration was increased in the nickel plating liquid, the plating thickness became thick, such that corrosion resistance was more excellent.

Figure 4:
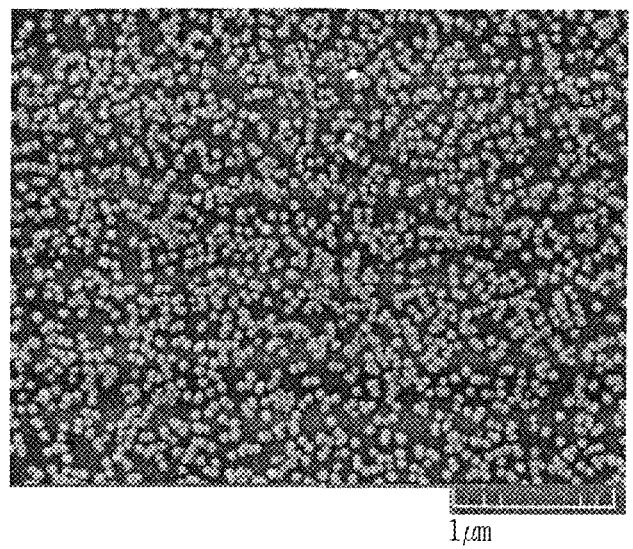
FIG. 4 is a scanning electron microscope (SEM) image of a pearl pigment sample prepared by Example 1.
Figure 5:
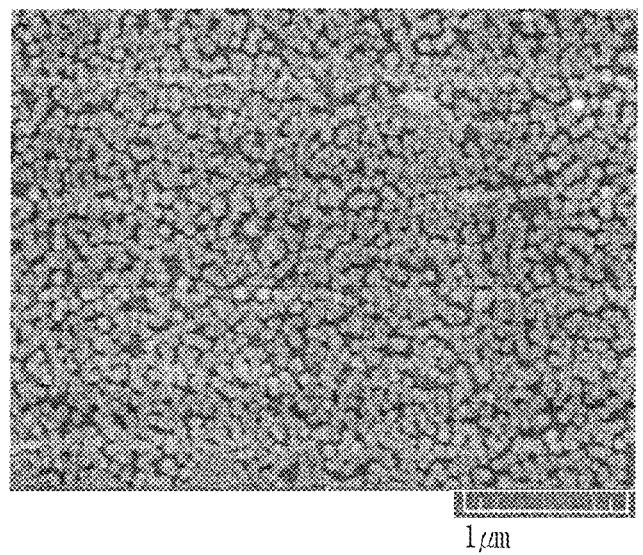
FIG. 5 is a scanning electron microscope (SEM) image of a pearl pigment sample prepared by Example 2.
Figure 6:
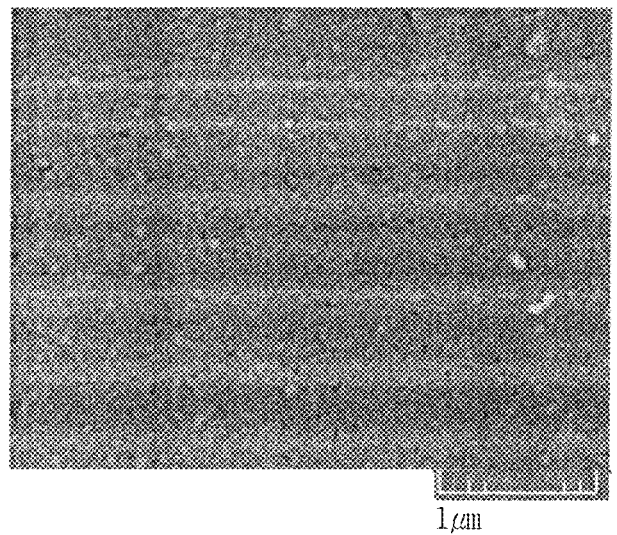
FIG. 6 is a scanning electron microscope (SEM) image of a pearl pigment sample prepared by Example 3.
Figure 7:
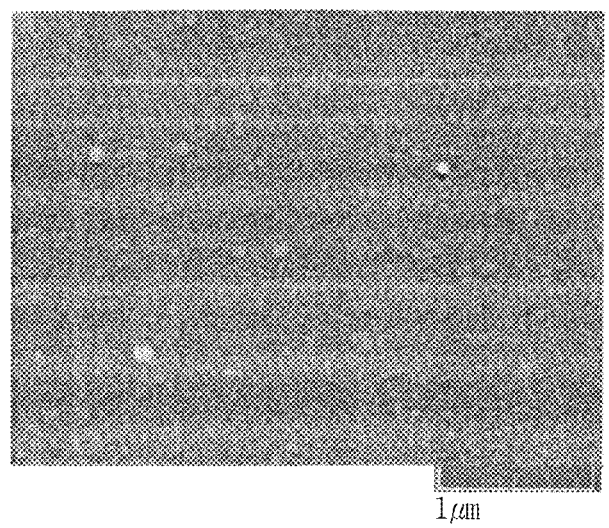
FIG. 7 is a scanning electron microscope (SEM) image of a pearl pigment sample prepared by Example 4.

FIG. 4 is a scanning electron microscope (SEM) image of a pearl pigment sample prepared by Example 1, FIG. 5 is a scanning electron microscope (SEM) image of a pearl pigment sample prepared by Example 2, FIG. 6 is a scanning electron microscope (SEM) image of a pearl pigment sample prepared by Example 3, and FIG. 7 is a scanning electron microscope (SEM) image of a pearl pigment sample prepared by Example 4.

Referring to FIGS. 4 to 7, it could be seen that as the nickel concentration of the electroless plating liquid was increased, an amount at which nickel was attached was also increased. According to the increase in the attachment amount of nickel, electrical conductivity and corrosion resistance could be more improved as shown in Tables 2 and 3 above.

Although the exemplary embodiments of the present invention have been described, various changes and modifications can be made by those skilled in the art without the scope of the appended claims of the present invention. Such changes and modifications should also be understood to fall within the scope of the present invention. Therefore, the protection scope of the present invention should be determined by the appended claims to be described below.

The invention claimed is:

1. A method for preparing a pigment, the method comprising:
   (a) forming a suspension by stirring and dispersing flakes in water;
   (b1) coating tin (Sn) layer on surfaces of the flake by adding and stirring a tin compound to the suspension;
   (b2) dehydrating and washing the coated flakes;
   (b3) forming a catalyst layer containing palladium on the surfaces of the flakes by adding the dehydrated and washed flakes to a palladium compound solution in order to separate the coated tin from the surfaces of the coated flakes and coat the palladium, as the catalyst layer, on the surfaces of the flakes;
   (b4) dehydrating and washing the palladium-coated flakes; and
   (c) forming a metal layer by plating the surfaces of the palladium-coated flakes,
   wherein in step (b2), the dehydrating and washing is performed two (2) to four (4) times.

2. The method of claim 1, wherein the flakes are plate-shaped flakes having a size of 5 μm to 100 μm in diameter and a metal oxide-coated composition.

3. The method of claim 1, wherein in step (a), the suspension includes 1 wt % to 20 wt % flakes.

4. The method of claim 1, wherein in step (b4), the dehydrating and washing is performed two (2) to four (4) times.

5. The method of claim 1, wherein
the metal layer contains nickel, and
the metal layer is formed by an electroless nickel plating.

6. The method of claim 5, wherein step (c) includes:
   (c1) adding the palladium-coated flakes to an electroless nickel plating liquid containing sodium hypophosphite,
   (c2) electroless nickel plating on the palladium-coated flakes at a temperature of 70° C. or more for 1 minute or more, and
   (c3) dehydrating and washing the flakes on which the nickel is plated, followed by drying.

7. The method of claim 6, wherein the electroless nickel plating in step (c2) is performed at a temperature of 80° C. to 90° C. for 1 to 30 minutes.

* * * * *